3,651,236
METHOD FOR INHIBITING HISTAMINE FORMATION

Robert Gerard Kelly, Monsey, and Leon Ellenbogen, New City, N.Y., assignors to American Cyanamid Company, Stamford, Conn.
No Drawing. Continuation-in-part of application Ser. No. 811,661, Mar. 28, 1969. This application Nov. 20, 1970, Ser. No. 91,579
Int. Cl. A61k 27/00
U.S. Cl. 424—317       5 Claims

ABSTRACT OF THE DISCLOSURE

This disclosure describes compositions of matter useful for inhibiting the formation of histamine in mammals and the method of inhibiting histamine formation in mammals therewith, the active ingredients of said compositions of matter being 4-bromo-3-hydroxybenzyl alcohol and/or 4-bromo-3-hydroxybenzoic acid.

CROSS REFERENCE TO RELATED APPLICATION

This application is a continuation-in-part of our copending application Ser. No. 811,661, filed Mar. 28, 1969, now abandoned.

BRIEF SUMMARY OF THE INVENTION

This invention relates to novel compositions of matter useful for inhibiting the formation of histamine in mammals. More particularly, it relates to therapeutic compositions containing 4-bromo-3-hydroxybenzyl alcohol or 4-bromo-3-hydroxybenzoic acid, or mixtures thereof, which inhibit histamine formation in mammals. The invention includes the new compositions of matter and the method of inhibiting histamine formation in mammals therewith.

It is well established that histamine is implicated in a number of physiological functions including, for example, the nervous system, peripheral circulation, gastric hyperacidity, and allergic manifestations such as hay fever. The decarboxylation of histidine by the specific enzyme histidine decarboxylase results in the formation of histamine in mammals.

Our invention is based upon the discovery that 4-bromo-3-hydroxybenzyl alcohol and 4-bromo-3-hydroxybenzoic acid are potent inhibitors of the enzyme histidine decarboxylase with resultant inhibition of histamine formation in mammals. The mode of action of the active compounds of the present invention thus differs from that of known antihistaminic compounds which ordinarily merely counteract the existing released or formed histamine.

DETAILED DESCRIPTION OF THE INVENTION

Also embraced within the scope of the present invention are the non-toxic, pharmacetuically acceptable cationic salts of 4 - bromo-3-hydroxybenzyl alcohol and 4-bromo-3-hydroxybenzoic acid. Included are the monobasic salts of 4-bromo-3-hydroxybenzyl alcohol and the monobasic and dibasic salts of 4-bromo-3-hydroxybenzoic acid. The cations comprised in these salts include, for example, the non-toxic metal cations such as the sodium ion, potassium ion, calcium ion, magnesium ion as well as the organic amine cations such as the tri(lower alkyl)amine cations (e.g., triethylamine), procaine, and the like.

The effectiveness of the active compounds of the present invention in inhibiting the activity of the enzyme histidine decarboxylase was determined by the method of Levine and Watts, Biochemical Pharmacology 15, 841–849 (1966) with the modifications of Ellenbogen et al., Biochemical Pharmacology 18, March 1969. In this procedure, the inhibition of rat gastric histidine decarboxylase activity was determined by measuring the radioactive carbon dioxide released from carboxyl-labeled histidine. The incubation tubes used in the procedure are described on page 275 of the test "Isotopes in Experimental Pharmacology," L. J. Roth, editor, University of Chicago Press (1965).

The effectiveness of the compounds of this invention and of brocresine (4-bromo-3-hydroxybenzyloxyamine phosphate a known inhibitor of histidine decarboxylase) in inhibiting the activity of the rat gastric enzyme histidine decarboxylase in vivo was demonstrated by three different procedures as follows:

(A) In vivo inhibition of rat gastric histidine decarboxylase following intraperitoneal doses of 200 milligrams per kilogram of body weight of the indicated compounds was demonstrated. The source of the enzyme was the pyloric portion of the adult rat stomach. The results appear in terms of percent inhibition in Table I below.

TABLE I

| | Percent | | |
|---|---|---|---|
| Time (minutes) after administration | Brocresine | 4-bromo-3-hydroxybenzyl alcohol | 4-bromo-3-hydroxybenzoic acid |
| 30 | 26 | | |
| 60 | 33 | 42 | |
| 90 | | 40 | 50 |

(B) In vivo inhibition of gastric free hydrochloric acid secretion in pylorus ligated rats, following the procedure of Shay et al., Gastroenterology 5, 43–61 (1945), was demonstrated. Intraperitoneal doses of the indicated compounds were administered at 200 mg./kg. of body weight. The results appear in terms of percent inhibition of total acid in Table II below.

TABLE II

| | Percent | | |
|---|---|---|---|
| Time (minutes) after administration | Brocresine | 4-bromo-3-hydroxybenzyl alcohol | 4-bromo-3-hydroxybenzoic acid |
| 30 | 35 | 83 | 30 |
| 60 | 62 | 74 | 30 |

(C) In vivo inhibition of rat fetal histidine decarboxylase by plasma from orally treated rats, following the procedure of Ellenbogen et al., Biochemical Pharmacology 18, March 1969, was demonstrated. Oral doses of the indicated compounds were administered at 60 mg./kg. of body weight. The results appear in terms of percent inhibition in Table III below.

TABLE III

| | Percent | | |
|---|---|---|---|
| Time (minutes) after administration | Brocresine | 4-bromo-3-hydroxybenzyl alcohol | 4-bromo-3-hydroxybenzoic acid |
| 15 | 75 | | 15 |
| 30 | 39 | 16 | 32 |
| 60 | 32 | | |

4-bromo-3-hydroxybenzyl alcohol, 4-bromo-3-hydroxybenzoic acid, and their non-toxic pharmaceutically acceptable cationic salts have thus been found to be highly useful for inhibiting the activity of histidine, decarboxylase in mammals in the treatment of urticaria, systemic mastocytosis. Zollinger-Ellison syndrome, dermographism, duodenal ulcer and hay fever when administered in amounts ranging from about 0.5 mg. to about 50 mg. per kg. of body weight per day. A preferred dosage regimen for optimum results would be from about 2 mg. to about 30 mg. per kg. of body weight per day, and such dosage units are employed that a total of from about 140 mg. to about 2100 mg. of active ingredient for a subject of about 70 kg. body weight are administered in a 24 hour period. More specifically, a daily dose of about 0.4 g. to about 2.0 g. of active ingredient for an average mature mammal and a daily dose of about 0.15 g. to about 0.7 g. of active ingredient for an immature mammal. An immature mammal is defined as not yet adult or fully developed and a mature mammal as fully developed. The compounds of the present invention in the described dosages are intended to be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of 4-bromo-3-hydroxybenzyl alcohol

In 10 ml. of 1 N aqueous sodium hydroxide was dissolved 1.0 g. of 4-bromo-3-hydroxybenzaldehyde and to this solution was added 0.1 g. of sodium borohydride with cooling and stirring. After 15 minutes, the reaction mixture was acidified with 5 N aqueous sulfuric acid. The product which precipitated was removed by filtration and recrystallized from chloroform. There was thus obtained 0.8 g. of 4-bromo-3-hydroxybenzyl alcohol, M.P. 101°–102° C.

EXAMPLE 2

Preparation of sodium 2-bromo-5-hydroxymethylphenolate

In 100 ml. of methanol was dissolved 20.3 g. of 4-bromo-3-hydroxybenzyl alcohol and 5.4 g. of sodium methoxide and the resulting solution was evaporated to dryness. There was thus obtained sodium 2-bromo-5-hydroxymethylphenolate as a white powder.

EXAMPLE 3

Preparation of 4-bromo-3-hydroxybenzoic acid

To a clear solution of m-hydroxybenzoic acid, 18.2 g., in 180 ml. of glacial acetic acid, there was added, with stirring and cooling, a solution of 21.1 g. of bromine in 70 ml. of glacial acetic acid. Cooling was continued for an hour after addition was complete. After standing at room temperature for 12 hours, the reaction mixture was distilled under vacuum until 160 ml. of distillate had come over. The residue was chilled in a refrigerator to solidify the entire mass. Upon removal, the acetic acid began to melt and the mixture was stirred until the temperature rose to 14°–15° C. Filtration gave a solid which was washed with 100–200 ml. of cold water and dried overnight. Crystallization from a minimum amount of boiling water gave 5 g. of white crystals, M.P. 225°–226° C.

EXAMPLE 4

Preparation of potassium 4-bromo-3-hydroxybenzoate

In 100 ml. of water was dissolved 21.7 g. of 4-bromo-3-hydroxybenzoic acid and 5.6 g. of pellet potassium hydroxide and the resulting solution was evaporated to dryness. There was thus obtained potassium 4-bromo-3-hydroxybenzoate as an off white powder.

EXAMPLE 5

Preparation of capsule formulation

| Ingredient: | Milligrams per capsule |
|---|---|
| 4-bromo-3-hydroxybenzyl alcohol | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 6

Preparation of tablet formulation

| Ingredient: | Milligrams per tablet |
|---|---|
| 4-bromo-3-hydroxybenzoic acid | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tabletting machine. Each tablet contains 300 milligrams of active ingredient.

EXAMPLE 7

Preparation of oral syrup formulation

| Ingredient: | | Amount |
|---|---|---|
| 4-bromo-3-hydroxybenzyl alcohol | mg | 5000 |
| Sorbitol solution (70% N.F.) | ml | 40 |
| Sodium benzoate | mg | 150 |
| Sucaryl | mg | 90 |
| Saccarin | mg | 10 |
| Red Dye (F.D. & C. No. 2) | mg | 10 |
| Cherry flavor | mg | 50 |
| Distilled water, q.s. to 100 ml. | | |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:

1. The method of inhibiting the activity of the enzyme histidine decarboxylase in mammals which comprises administering to a mammal in need of such therapy an effective amount of a compound selected from the group consisting of 4-bromo-3-hydroxybenzyl alcohol, 4-bromo-3-hydroxybenzoic acid, and the non-toxic pharmaceutically acceptable cationic salts thereof.

2. The method according to claim 1 wherein the compound is 4-bromo-3-hydroxybenzyl alcohol.

3. The method according to claim 1 wherein the compound is 4-bromo-3-hydroxybenzoic acid.

4. The method according to claim 1 wherein the compound is the sodium salt of 4-bromo-3-hydroxybenzyl alcohol.

5. The method according to claim 1 wherein the compound is sodium 4-bromo-3-hydroxybenzoate.

References Cited

Dunning et al., Chem. Abst. vol. 30 (1936), p. 7555 [8].
Brink et al., Chem. Abst. vol. 63 (1965), p. 9844b.
Spivey, Chem Abst., vol. 56 (1962), p. 4685i.

SAM ROSEN, Primary Examiner

U.S. Cl. X.R.

424—347